(12) United States Patent
Shima et al.

(10) Patent No.: US 9,942,550 B2
(45) Date of Patent: Apr. 10, 2018

(54) IMAGE ENCODING DEVICE, IMAGE ENCODING METHOD AND PROGRAM, IMAGE DECODING DEVICE, AND IMAGE DECODING METHOD AND PROGRAM

(71) Applicant: CANON KABUSHIKI KAISHA, Tokyo (JP)

(72) Inventors: Masato Shima, Tokyo (JP); Mitsuru Maeda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 236 days.

(21) Appl. No.: 14/649,821

(22) PCT Filed: Dec. 3, 2013

(86) PCT No.: PCT/JP2013/007089
§ 371 (c)(1),
(2) Date: Jun. 4, 2015

(87) PCT Pub. No.: WO2014/087641
PCT Pub. Date: Jun. 12, 2014

(65) Prior Publication Data
US 2015/0319438 A1    Nov. 5, 2015

(30) Foreign Application Priority Data
Dec. 7, 2012  (JP) .................................. 2012-268299

(51) Int. Cl.
*H04N 5/262*    (2006.01)
*H04N 19/124*    (2014.01)
(Continued)

(52) U.S. Cl.
CPC ......... *H04N 19/124* (2014.11); *H04N 19/136* (2014.11); *H04N 19/14* (2014.11);
(Continued)

(58) Field of Classification Search
CPC .... H04N 19/124; H04N 19/136; H04N 19/14; H04N 19/176; H04N 19/184; H04N 19/186; H04N 19/46
See application file for complete search history.

(56) References Cited

U.S. PATENT DOCUMENTS

2009/0110054 A1\* 4/2009 Kim ..................... H04N 19/647
375/240.1

FOREIGN PATENT DOCUMENTS

WO        98/27736 A2     6/1998
WO        01/56298 A1     8/2001

OTHER PUBLICATIONS

Nakasu, et al.: "Intra/Inter Mode Adaptive DCT Coding System of HDTV Signals", XP 000379981, Published Sep. 4, 1991, pp. 439-446.

(Continued)

*Primary Examiner* — Tat Chio
(74) *Attorney, Agent, or Firm* — Canon USA, Inc. I.P. Division

(57) ABSTRACT

A luminance signal of an image and a chrominance signal of a bit depth different from that of the luminance signal is input, a luminance quantization parameter used to quantize the input luminance signal in block units is generated, a chrominance quantization parameter used to quantize the input chrominance signal in block units within a range depending on the luminance quantization parameter is generated, the input luminance signal is quantized by the luminance quantization parameter, the chrominance signal is quantized by the chrominance quantization parameter, and the range is changed depending on the difference between the bit depth of the luminance signal and the chrominance signal during the generation of the chrominance quantization parameter.

18 Claims, 8 Drawing Sheets

(51) Int. Cl.
*H04N 19/176* (2014.01)
*H04N 19/46* (2014.01)
*H04N 19/136* (2014.01)
*H04N 19/14* (2014.01)
*H04N 19/186* (2014.01)
*H04N 19/184* (2014.01)
*H04N 19/61* (2014.01)
*H04N 19/463* (2014.01)
*H04N 19/98* (2014.01)

(52) U.S. Cl.
CPC ......... *H04N 19/176* (2014.11); *H04N 19/184* (2014.11); *H04N 19/186* (2014.11); *H04N 19/46* (2014.11); *H04N 19/463* (2014.11); *H04N 19/61* (2014.11); *H04N 19/98* (2014.11)

(56) References Cited

OTHER PUBLICATIONS

Gisle Bjontegaard, et al: "Definition of the new coding elements from Telenor", 10th. VCEG Meeting; May 16, 2000-May 18, 2000; Osaka, JP; (Video Coding Experts Group of ITU-T SG.16), Question: Q. 15/SG16, Filename: q15j28.doc, XP030003057A, ISSN: 0000-0466, pp. 1-25.

ITU-T H.264 (Jun. 2011) Advanced video coding for generic audiovisual services, two (2) cover pages (unnumbered) through Summary, table of contents and foreword (see pp. i-xix) and pp. 81, 182-183 and 289.

International Search Report and Written Opinion for PCT/JP2013/007089 and notification of transmittal of the ISR/WO, dated Mar. 25, 2014.

* cited by examiner

IMAGE ENCODING DEVICE, IMAGE ENCODING METHOD AND PROGRAM, IMAGE DECODING DEVICE, AND IMAGE DECODING METHOD AND PROGRAM

TECHNICAL FIELD

The present invention relates to an image encoding device, an image decoding method and program, an image decoding device, and an image encoding method and program, and particularly relates to encoding and decoding quantization parameters.

BACKGROUND ART

In general, H.264/MPEG-4 AVC (hereafter, referred to as H.264) is used as a method to encode video images to be stored in compressed format. According to H.264 (NPL 1:ITU-T H.264 (06/2011) Advanced video coding for generic audiovisual services), multiple profiles defining encoding processing restrictions are defined. Among these, the High 10 profile supports images with bit depths between 8 to 10 bits for both luminance and chrominance.

The High 10 profile in H.264 not only supports images with bit depths between 8 to 10 bits for both luminance and chrominance, but also supports images with difference between the bit depths for the luminance and chrominance.

According to H.264, the applicable range regarding quantization parameters corresponding to the image bit depths are decided. For example, when the image luminance signal has a bit depth of 8 bits, the values for the quantization parameter is between 0 to 51, and when the bit depth is 10 bits, the values for the quantization parameter are between −12 and 51. Thus, the configuration lowers the minimum value of the quantization parameter when the bit depth is increased. The difference between the quantization parameter corresponding to the luminance signal (hereafter, referred to as luminance quantization parameter) and the quantization parameter corresponding to the chrominance signal (hereafter, referred to as chrominance quantization parameter) is defined by chroma_qp_index_offset code. When the luminance quantization parameter is 20, and the chroma_qp_index_offset code is five, for example, the chrominance quantization parameter is 25. However, the range of values possible for the chroma_qp_index_offset code is between −12 to +12. For this reason, the difference between the luminance quantization parameter and the chrominance quantization parameter may not be particularly significant with this specification.

When the luminance signal is 10 bits and the chrominance signal is 8 bits, the minimum value of the luminance quantization parameter is −12 and the minimum value of the chrominance quantization parameter is zero. For this reason, when the luminance quantization parameter is −12, the value for the chrominance quantization parameter is restricted to zero as the maximum value of the chroma_qp_index_offset code is 12. That is to say, when the bit depths of the luminance signal and the chrominance signal are different, the range of the usable chrominance quantization parameter value becomes drastically reduced depending on the value of the luminance quantization parameter.

It has been found desirable to increase the usable value of the chrominance quantization parameter when the bit depths between the luminance signal and the chrominance signal are different, to enable image encoding and decoding with higher levels of image quality control of chrominance signals.

SUMMARY OF INVENTION

Technical Problem

In order to resolve the previously described problem, the image encoding device according to the present invention has the following configuration. Included are an input unit configured to input a luminance signal of an image and a chrominance signal of a bit depth different from that of the luminance signal, a luminance quantization parameter generating unit configured to generate a luminance quantization parameter used to quantize the input luminance signal in block units, a chrominance quantization parameter generating unit configured to generate a chrominance quantization parameter used to quantize the input chrominance signal in block units within a range depending on the luminance quantization parameter, and a quantizing unit configured to quantize the input luminance signal by the luminance quantization parameter, and to quantize the chrominance signal by the chrominance quantization parameter, wherein the chrominance quantization parameter generating unit changes the range depending on the difference between the bit depth of the luminance signal and the chrominance signal.

An image decoding device according to the present invention has the following configuration. That is to say, a demultiplexing unit configured to input a bit stream in which a luminance signal of an image and a chrominance signal of a bit depth different from that of the luminance signal are encoded, to decode a header including the bit depth of the luminance signal and the bit depth of the chrominance signal, and to demultiplex the necessary codes, a coefficient decoding unit configured to decode quantization coefficients, a quantization parameter decoding unit configured to decode quantization parameter difference information necessary to reconstruct a luminance quantization parameter used to perform inverse quantization of luminance components of the quantization coefficients and to reconstruct a chrominance quantization parameter used to perform inverse quantization of chrominance components of the quantization coefficients, a chrominance quantization parameter reconstructing unit configured to reconstruct the chrominance quantization parameter on the basis of the luminance quantization parameter and the quantization parameter difference information within a range determined depending on the luminance quantization parameter and the bit depth of the chrominance signal, and an inverse quantization unit configured to perform inverse quantization of the quantization coefficients using the luminance quantization parameter and the chrominance quantization parameter, wherein the chrominance quantization parameter reconstructing unit changes the range depending on the difference between the bit depth of the luminance signal and the chrominance signal.

Further features of the present invention will become apparent from the following description of exemplary embodiments with reference to the attached drawings.

Advantageous Effects of Invention

According to the present invention, the applicable values of the chrominance quantization parameter are increased when the bit depth between the luminance signal and the chrominance signal are different, which enables image encoding and decoding having a high image quality control of the chrominance signal.

DESCRIPTION OF EMBODIMENTS

Figure 1:
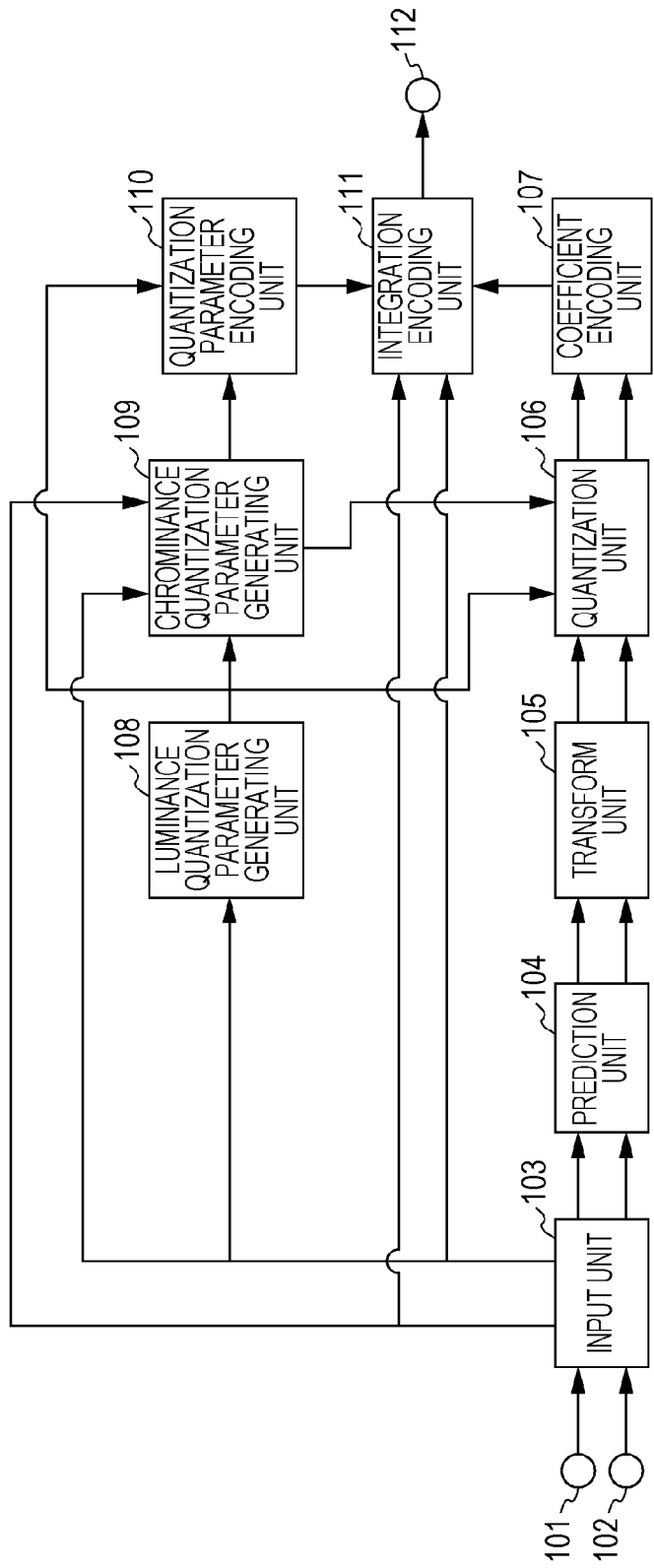
FIG. 1 is a block diagram illustrating a configuration of an image encoding device according to a first Embodiment and a third Embodiment.

Hereafter, the preferable embodiments of the present invention will be described in detail with reference to the attached drawings. The configurations represented by the following embodiments are merely examples, nor is the present invention is not limited to the configurations illustrated in the drawings.

First Embodiment

Hereafter, the embodiments of the present invention will be described with reference to the drawings. FIG. 1 is a block diagram illustrating an image encoding device according to an embodiment. A terminal 101 and 102 in FIG. 1 input image data. According to the present embodiment, luminance signal are input from the terminal 101, and chrominance signals are input from the terminal 102.

An input unit 103 divides the input image data into square-shaped block units. A prediction unit 104 performs intra prediction, which is the intra-frame prediction at each block unit, and inter prediction, which is the inter-frame prediction. A transform unit 105 performs orthogonal transformation on the prediction error generated by the prediction unit 104 at each block unit, and calculates the transform coefficient. A quantization unit 106 quantizes the transform coefficient calculated by the transform unit 105 using respective quantization parameters for luminance and chrominance, and generates a quantization coefficient. A coefficient encoding unit 107 encodes the quantization coefficient generated by the quantization unit 106, and generates quantization coefficient code.

A luminance quantization parameter generating unit 108 generates a luminance quantization parameter, which is used to quantize the luminance portion of the transform coefficient by the quantization unit 106, on the basis of the bit depth of the input luminance signal. A chrominance quantization parameter generating unit 109 generates a chrominance quantization parameter, which is used to quantize the transform coefficient of the chrominance portion by the quantization unit 106, on the basis of the bit depth of the input luminance signal, the luminance quantization parameter, and bit depth of the chrominance signal. A quantization parameter encoding unit 110 encodes the information related to the quantization parameters, and generates quantization parameter information code.

An integration encoding unit 111 encodes information necessary for decoding the bit stream generated upstream into a header, and so forms and outputs the bit stream from the quantization coefficient code and the quantization parameter information code. A terminal 112 externally outputs the bit stream generated by the integration encoding unit 111.

The operation to encode the image in the previously described image encoding device will be described below. According to the present embodiment, the configuration inputs the moving image data in units of frames, but the configuration may also input still image data in units of frames.

One frame of the luminance signal input from the terminal 101 and one frame of the chrominance signal input from the terminal 102 are input into the input unit 103. According to the present embodiment, the input luminance signal has a bit depth of 10 bits and the input chrominance signal has a bit depth of 8 bits, but the bit depths of the luminance signal and the chrominance signal are not limited thusly. The bit depth of the input luminance signal is output as the luminance bit depth information to the downstream luminance quantization parameter generating unit 108, the chrominance quantization parameter generating unit 109, and the integration encoding unit 111. The bit depth of the input chrominance signal is output as the chrominance bit depth information to the chrominance quantization parameter generating unit 109 and the integration encoding unit 111 downstream. The image data is divided into square-shaped blocks at the input unit 103 for both luminance and chrominance, and the divided blocks of the input image are output to the downstream prediction unit 104.

The luminance quantization parameter used to quantize the luminance component is decided at the luminance quantization parameter generating unit 108 on the basis of the luminance bit depth information output from the input unit 103. The method to decide the luminance quantization parameter is not limited thusly, it could adaptively be determined depending on the input image, or it could be determined by user or other external input. The luminance quantization parameter may also be decided by performing a control based on the amount of data regarding the bit stream output from the terminal 112. According to the present embodiment, however, the applicable range of the luminance quantization parameter is restricted on the basis of the luminance bit depth information, in which the applicable range as the luminance quantization parameter QPy is determined from a luminance signal bit depth BDy regarding the following Expression (1).

[Math. 1]

$$6\times(8-BDy)\leq QPy\leq 51 \qquad (1)$$

According to the present embodiment, the luminance signal has a bit depth of 10 bits, and so the minimum value of according to the previously described Expression (1) is −12, and so the range of values for the luminance quantization parameter is from −12 to 51. If the generated luminance quantization parameter is outside of this range, either a clip processing or a remainder processing is performed to correct the value to be within this range. The decided luminance quantization parameter is output to the quantization unit 106, the chrominance quantization parameter generating unit 109, and the quantization parameter encoding unit 110.

The chrominance quantization parameter used to quantize the chrominance component is decided at the by the chrominance quantization parameter generating unit 109 from the luminance bit depth information input from the input unit 103, the chrominance bit depth information, and the luminance quantization parameter input from the luminance quantization parameter generating unit 108. The method to decided the chrominance quantization parameter is not limited thusly, it could adaptively be determined depending on the input image, or it could be determined by user or other external input. According to the present embodiment, however, the applicable range of the chrominance quantization parameter itself is restricted on the basis of the chrominance bit depth information, in which the applicable range as the chrominance quantization parameter QPc itself is determined from a chrominance signal bit depth BDc regarding the following Expression (2).

[Math. 2]

$$6\times(8-\mathrm{BD}c)\leq \mathrm{QP}c\leq 51 \quad (2)$$

According to the present embodiment, the applicable range of a quantization parameter difference information QPdiff, which represents the difference between the luminance quantization parameter and the chrominance quantization parameter, is determined by the following Expressions (3) and (4) on the basis of the luminance bit depth information BDy and the chrominance bit depth information BDc.

When BDc is less than BDy,
[Math. 3]

$$-12\leq \mathrm{QPdiff}\leq 12+6\times(\mathrm{BD}y-\mathrm{BD}c) \quad (3)$$

For all other cases,
[Math. 4]

$$-12-6\times(\mathrm{BD}c-\mathrm{BD}y)\leq \mathrm{QPdiff}\leq 12 \quad (4)$$

The applicable range of values of the chroma_qp_offset code corresponding to the previously described QPdiff in H.264 has been restricted to a range of minus 12 to plus 12. In comparison with the present embodiment, the applicable range of values of the quantization parameter difference information QPdiff is variable depending on the difference between the bit depth BDy of the luminance signal and the bit depth BDc of the chrominance signal. The applicable range values of is expanded in the case of the present embodiment. The chrominance quantization parameter QPc is expressed by the following Expression (5) using the luminance quantization parameter QPy and the quantization parameter difference information QPdiff.

$$\mathrm{QP}c=\mathrm{QP}y+\mathrm{QPdiff} \quad (5)$$

Thus, substituting either the previously described Expression (3) or (4) with Expression (5), the applicable range of the chrominance parameter QPc is expressed as determined by either the following Expressions (2)' or (4)'.

When BDc is less than BDy,
[Math. 5]

$$6\times(8-\mathrm{BD}c)\leq \mathrm{QP}c\leq 51 \quad (2)'$$

[Math. 6]

$$\mathrm{QP}y-12\leq \mathrm{QP}c\leq \mathrm{QP}y+12+6\times(\mathrm{BD}y-\mathrm{BD}c) \quad (3)'$$

For all other cases,
[Math. 7]

$$6\times(8-\mathrm{BD}c)\leq \mathrm{QP}c\leq 51 \quad (2)'$$

[Math. 8]

$$\mathrm{QP}y-12-6\times(\mathrm{BD}c-\mathrm{BD}y)\leq \mathrm{QP}c\leq \mathrm{QP}y+12 \quad (4)'$$

As a result, when the luminance quantization parameter has a minimum value of −12 in the case of the present embodiment, the chrominance quantization parameter may have a value within a range of 0 to 12 instead of being limited only to zero. If the generated chrominance quantization parameter is outside of this range, then either a clip processing or remainder processing is performed to correct the value to be within this range. The decided chrominance quantization parameter is output to the quantization unit 106, the difference between the luminance quantization parameter and the chrominance quantization parameter is calculated, and the resulting quantization parameter difference information is output to the quantization parameter encoding unit 110.

The luminance quantization parameter input from the luminance quantization parameter generating unit 108 and the quantization parameter difference information input from the chrominance quantization parameter generating unit 109 are encoded at the quantization parameter encoding unit 110. The encoding method is not particularly limited, and some examples that may be used include Golomb coding, arithmetic coding, and Huffman coding. The encoded result is output to the integration encoding unit 111 as the quantization parameter information code.

Conversely, the image data in separate block units for luminance and chrominance is input into the prediction unit 104, where block-unit prediction is performed. The prediction error is generated as the difference between the predicted image and the input image in block units and input to the transform unit 105.

Orthogonal transformation is performed at the transform unit 105 on the prediction error for both the luminance and chrominance input from the prediction unit 104 so as to generate a transform coefficient. The generated transform coefficient for both luminance and chrominance are output to the quantization unit 106.

Quantization is performed at the quantization unit 106 by applying the transform coefficient input from the transform unit 105 and using the luminance quantization parameter input from the luminance quantization parameter generating unit 108 and the chrominance quantization parameter input from the chrominance quantization parameter generating unit 109. The luminance quantization parameter is used in the transform coefficient corresponding to the luminance signal and the chrominance quantization parameter is used in the transform coefficient corresponding to the chrominance signal. The quantization result is output to the coefficient encoding unit 107 as the quantization coefficient.

Entropy coding is performed at the coefficient encoding unit 107 on the quantization coefficient for both the luminance and chrominance generated by the quantization unit 106 to generate the quantization coefficient code. The entropy encoding method is not particularly specified, and some example that may be used include Golomb coding, arithmetic coding, and Huffman coding. The generated quantization coefficient code is output to the integration encoding unit 111.

Information generated first as a precursor to the encoding process, which is the luminance bit depth information and the chrominance bit depth information input from the input unit 103, is encoded at the integration encoding unit 111 to generate various codes. These codes, the quantization coefficient code generated by the coefficient encoding unit 107, the quantization parameter code information generated by the quantization parameter encoding unit 110, and so forth are multiplexed to generate the bit stream. The bit stream generated as the end result is output externally from the terminal 112.

Figure 6:
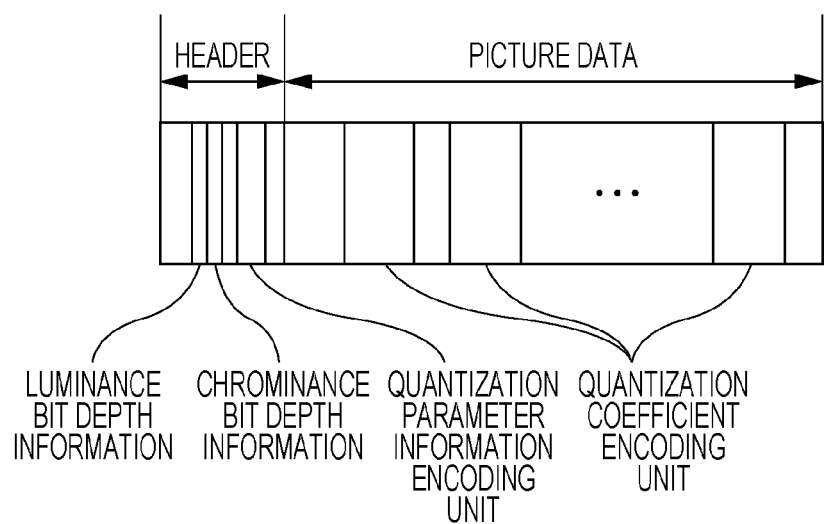
FIG. 6 is a diagram illustrating one example configuration of a bit stream generated according to either the first Embodiment or the third Embodiment and decoded according to either the second Embodiment or the fourth Embodiment.

FIG. 6 illustrates an example of a bit stream which includes the encoded luminance bit depth information and chrominance bit depth information, the quantization parameter information code, and the quantization coefficient code. The luminance bit depth information and the chrominance bit depth information is included in headers of any type of frame such as sequence or picture frames. The method to encode the luminance bit depth information and the chrominance bit depth information is not limited. The actual bit depth values may be encoded, of the difference between the bit depth and a specified fixed value (8 bits, for example) may be encoded as in H.264. The quantization parameter information code is necessary to calculate the luminance quantization parameter and the chrominance quantization parameter, and corresponds to the pic_init_qp_minus26 code and the chroma_qp_index_offset code and so forth in H.264. As previously described, the applicable range of the chroma_qp_index_offset code in H.264 had been fixed between −12 to +12, but this range is expanded to a range between −12 to +24 according to the present embodiment, depending on the difference between the luminance and the chrominance bit depth. The quantization coefficient code is multiplexed in the picture data portion in block units.

Figure 3:
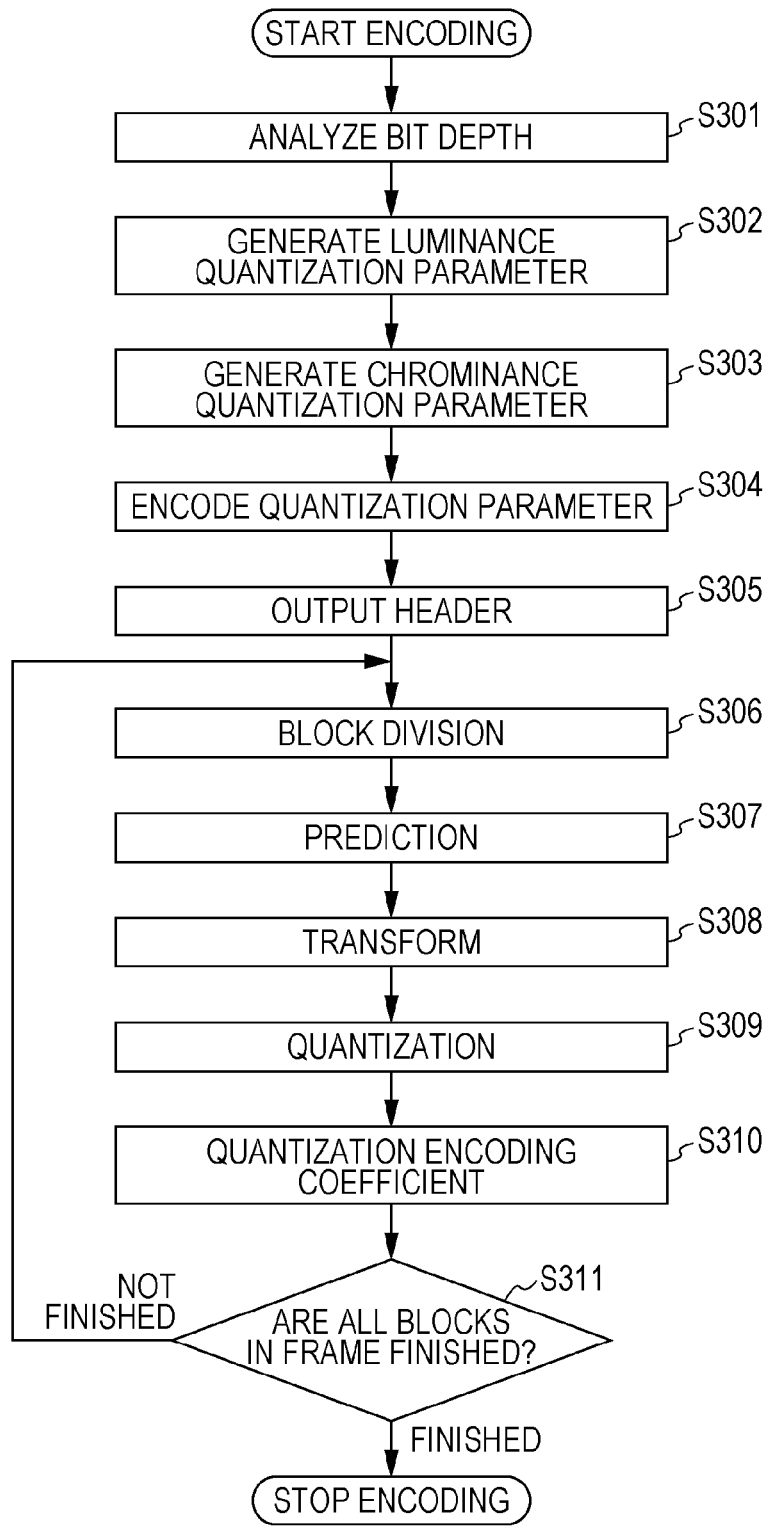
FIG. 3 is a flowchart illustrating a process to encode images regarding the image encoding device according to the first Embodiment and the third Embodiment.

FIG. 3 is a flowchart illustrating an encoding processing in the image encoding device according to the first Embodiment.

First, the bit depths of the luminance signal and the chrominance signal input from the input unit 103 are analyzed at step S301, and the luminance bit depth information and the chrominance bit depth information are generated. This information is encoded by the integration encoding unit 111.

At step S302, the luminance quantization parameter generating unit 108 decides the luminance quantization parameter on the basis of the luminance bit depth information generated at step S301. The method to decide the luminance quantization parameter is not limited, and may be adaptively determined depending on the input image or by user or other external input. According to the present embodiment and as described using Expression (1), however, the applicable range of the luminance quantization parameter based on the luminance bit depth information is restricted.

At step S303, the chrominance quantization parameter generating unit 109 decides the chrominance quantization parameter on the basis of the luminance bit depth information generated at step S301, chrominance bit depth information, and the luminance quantization parameter generated at step S302. According to the present embodiment and as described using either Expression (2)' or (4)', however, the applicable range of the chrominance quantization parameter is restricted to an expanded range depending on the difference between the luminance bit depth information and the chrominance bit depth information. The difference of the luminance quantization parameter generated at step S302 and the chrominance quantization parameter generated at this step is calculated as the quantization parameter difference information.

At step S304, the quantization parameter encoding unit 110 encodes the luminance quantization parameter generated at step S302 and the quantization parameter difference information generated at step S303 to generate the quantization parameter information code.

At step S305, the integration encoding unit 111 first encodes the luminance bit depth information and chrominance bit depth information generated at step S301 to generate various codes. Then the integration encoding unit 111 generates and outputs a header for the bit stream from these codes and the encoded quantization parameter information generated at step S304.

At step S306, the input unit 103 separates the input image data for both luminance and chrominance into square-shaped blocks. At step S307, the prediction unit 104 performs block-unit prediction on the image data divided into blocks at step S306. The prediction error is generated as the difference between the input image in block units and the predicted image. At step S308, the transform unit 105 performs orthogonal transformation on the prediction error generated at step S307 to generate the transform coefficient. At step S309, the quantization unit 106 applies the transform coefficient generated at step S308 using the luminance quantization parameter decided at step S302 and the chrominance quantization parameter decided at step S303 to perform the quantization and generate the quantization coefficient. The luminance quantization parameter is used in the transform coefficient corresponding to the luminance signal, and the chrominance quantization parameter is used in the transform coefficient corresponding to the chrominance signal at this step.

At step S310, the coefficient encoding unit 107 performs entropy coding on the quantization coefficient generated at step S309 to generate the encoded quantization coefficient. The integration encoding unit 111 generates the bit stream that also includes other encoded data. At step S311, the image encoding device determines whether or not the encoding of all blocks in the frame is finished, in which the encoding process ends if finished, and the process returns to step S306 for the next frame if not finished.

The previously described configuration and operation, particularly at step S303, enables an encoding processing having high chrominance image quality control by expanding the applicable range of the chrominance quantization parameter depending on the difference between the luminance bit depth information and chrominance bit depth information.

According to the present embodiment, only one shared chrominance quantization parameter is defined for the chrominance components for U and V, but separate chrominance quantization parameters may be defined for U and V. In this case, the configuration may include multiple units of the chrominance quantization parameter generating unit 109, or the chrominance quantization parameter generating unit 109 may generate multiple chrominance quantization parameters and quantization parameter difference information.

According to the present embodiment, the quantization unit 106 is configured to quantize the transform coefficients for both the luminance and the chrominance, but the configuration may include a luminance quantization unit and a chrominance quantization unit to quantize the luminance transform coefficient and the chrominance transform coefficient, respectively.

Figure 5:
FIG. 5 is a table used to correct the chrominance quantization parameter used in H.264.

According to the present embodiment, the configuration uses the chrominance quantization parameter as it is calculated from the luminance quantization parameter, but a value corrected according to a predetermined table or other may be used as the chrominance quantization parameter. For example, the correction table illustrated in FIG. 5 which is also used in H.264 may be used.

According to the present embodiment, the same luminance quantization parameter and chrominance quantization parameter is used for the blocks in the frame, but the quantization parameter may be adjusted for every block in order to improve image quality. The configuration may enable both the luminance quantization parameter and the quantization parameter difference information to be adjusted for every block, or the configuration may only enable the luminance quantization parameter to be adjusted for every block, such that the quantization parameter difference information is only adjustable in units of frames.

While description has been made using fixed values in the Expressions, the Expressions are not limited to these values. The maximum and minimum values for the luminance quantization parameter regarding Expression (1), the applicable range of values of code being a range of minus 12 to plus 12, and so forth, may be set to other values.

Second Embodiment

Figure 2:
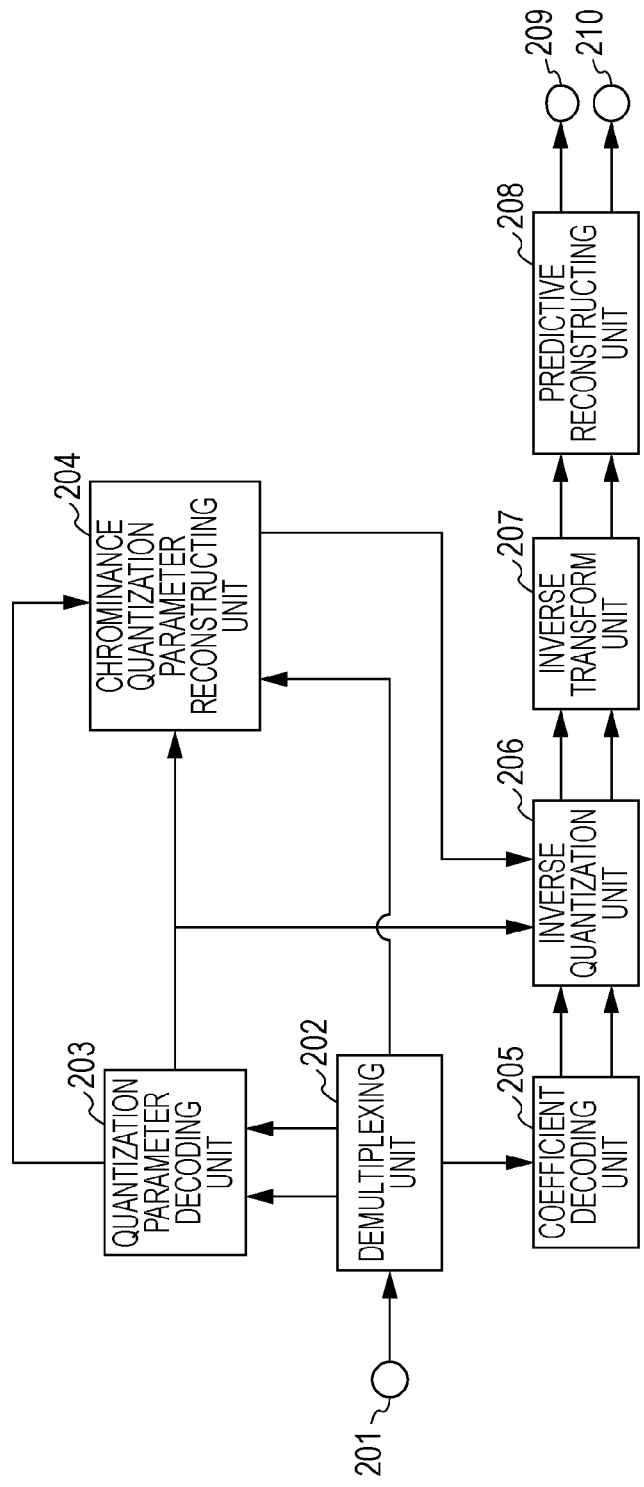
FIG. 2 is a block diagram illustrating a configuration of the image decoding device according to a second Embodiment.

FIG. 2 is a block diagram illustrating a configuration of the image decoding device according to a second Embodiment of the present invention. An example of the present embodiment will be described as a decoding of the bit stream generated according to the first Embodiment.

A terminal 201 inputs the encoded bit stream. A demultiplexing unit 202 demultiplexer the information related to the decoding processing and code data related to coefficients from the bit stream, and decodes the code data present in the header of the bit stream. The demultiplexing unit 202 performs the reverse operation as that of the integration encoding unit 111 in FIG. 1. A quantization parameter decoding unit 203 decodes information related to the quantization parameters. The quantization parameter decoding unit 203 performs the reverse operation as that of the quantization parameter encoding unit 110 in FIG. 1. A chrominance quantization parameter reconstructing unit 204 reconstructs the chrominance quantization parameter from information related to the quantization parameters, the luminance bit depth information, and the chrominance bit depth information.

A coefficient decoding unit 205 decodes the quantization coefficient code to regenerate the quantization coefficient. An inverse quantization unit 206 perform inverse quantization of the quantization coefficient using the luminance quantization parameter and the chrominance quantization parameter, and regenerates the transform coefficient. An inverse transform unit 207 conducts an inverse orthogonal transformation on the transform coefficient, and regenerates the prediction error. A predictive reconstructing unit 208 arbitrarily references a decoded pixel to generate the predicted image data, and generates and outputs regenerated image data from this predicted image data and the prediction error. Terminals 209 and 210 externally output the luminance signal and the chrominance signal regarding each image data.

Hereafter, the image decoding operation regarding the previously described image decoding device will be described. According to the present embodiment, the bit stream generated according to the first Embodiment will be decoded.

The bit stream input from the terminal 201 in FIG. 2 is input into the demultiplexing unit 202.

The information related to the decoding processing and the code data related to coefficients is demultiplexed from the bit stream at the demultiplexing unit 202, and code data present in the header of the bit stream and encoded data necessary to decode the quantization parameters and the bit depth information is decoded. Specifically, the quantization parameter information code, the luminance bit depth information, the chrominance bit depth information, and the quantization coefficient code are extracted. According to the present embodiment, first the luminance bit depth information and the chrominance bit depth information are extracted and decoded from the header of the bit stream illustrated in FIG. 6, and then the quantization parameter information code is extracted. The decoded luminance bit depth information is output to the quantization parameter decoding unit 203, and the decoded chrominance bit depth information is output to the chrominance quantization parameter reconstructing unit 204. Conversely, the extracted quantization parameter information code is output to the quantization parameter decoding unit 203, and the remaining code data including the quantization coefficient code is output to the coefficient decoding unit 205.

The quantization parameter code information input from the demultiplexing unit 202 is decoded at the quantization parameter decoding unit 203, and the luminance quantization parameter and the quantization parameter difference information is regenerated. According to the present embodiment, the applicable range of the luminance quantization parameter during the regeneration of the luminance quantization parameter is the range as expressed by Expression (1) using the luminance bit depth information according to the first Embodiment. For this reason, when the regenerated luminance quantization parameter is outside the range expressed by Expression (1), a clip processing or remainder processing is performed to correct the value to be within this range. The correction processing here is not particularly limited as long as it the same as the correction processing regarding the luminance quantization parameter generating unit 108 according to the first Embodiment. The regenerated quantization parameter difference information is output to the chrominance quantization parameter reconstructing unit 204, and the luminance quantization parameter is output to the chrominance quantization parameter reconstructing unit 204 and the inverse quantization unit 206.

The chrominance quantization parameter is regenerated at the chrominance quantization parameter reconstructing unit 204 from the luminance quantization parameter and quantization parameter difference information input from the quantization parameter decoding unit 203. According to the present embodiment, the applicable range of the chrominance quantization parameter during the regeneration of the chrominance quantization parameter is the range as expressed by Expression (2) using the chrominance bit depth information according to the first Embodiment. For this reason, when the regenerated chrominance quantization parameter is outside the range expressed by Expression (2), a clip processing or remainder processing is performed to correct the value to be within this range. The correction processing here is not particularly limited as long as it the same as the correction processing regarding the chrominance quantization parameter generating unit 109 according to the first Embodiment. The regenerated chrominance quantization parameter is output to the inverse quantization unit 206.

Conversely, the quantization coefficient code input from the demultiplexing unit 202 is decoded at the coefficient decoding unit 205 to regenerate the quantization coefficient. The regenerated quantization coefficients for both the luminance and chrominance are output to the inverse quantization unit 206.

Inverse quantization is performed on the quantization coefficients input from the coefficient decoding unit 205 at the inverse quantization unit 206. The luminance quantization parameter input from the quantization parameter decoding unit 203 is used for the quantization coefficient corresponding to the luminance signal. The chrominance quantization parameter input from the chrominance quantization parameter reconstructing unit 204 is used for the quantization coefficient corresponding to the chrominance signal. The inverse quantization result is generated as the transform coefficient and output to the inverse transform unit 207.

Inverse orthogonal transformation is performed at the inverse transform unit 207 on the transform coefficient for both luminance and chrominance input from the inverse quantization unit 206, the prediction error is regenerated and output to the predictive reconstructing unit 208.

Decoded pixels are arbitrarily reference to generate the predicted image at the predictive reconstructing unit 208, and the image data is regenerated from this predicted image and the prediction error for both the luminance and chrominance input from the inverse transform unit 207. The luminance signal and the chrominance signal for the regenerated image data is output externally from the terminal 209 and the terminal 210, respectively.

Figure 4:
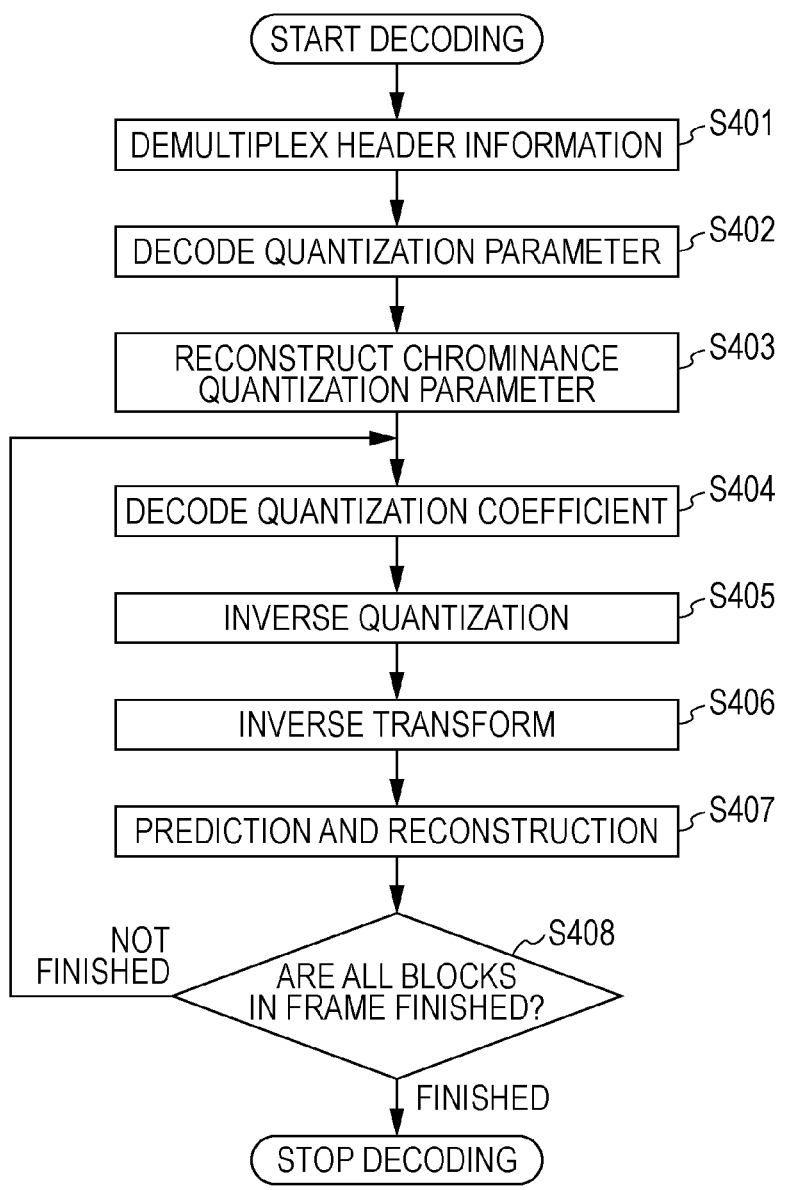
FIG. 4 is a flowchart illustrating a process to decode images regarding the image decoding device according to the second Embodiment and a fourth Embodiment.

FIG. 4 is a flowchart illustrating a process to decode the image regarding the image decoding device according to the second Embodiment.

First, at step S401, the demultiplexing unit 202 demultiplexes the information related to decoding and the code data related to the coefficients from the bit stream, and decodes the code data present in the header of the bit stream. Specifically, the luminance bit depth information and the chrominance bit depth information are regenerated, and the quantization parameter information code and the quantization coefficient code are demultiplexed.

At step S402, the quantization parameter decoding unit 203 decodes the quantization parameter information code demultiplexed at step S401, and the luminance quantization parameter and the quantization parameter difference information are regenerated. According to the present embodiment, as the applicable range of the luminance quantization parameter is determined during the regeneration of the luminance quantization parameter depending on the luminance bit depth information regenerated at step S401, the luminance quantization parameter is corrected as necessary. According to the present embodiment, for example, the luminance bit depth is 10 bits, and so the value of the luminance quantization parameter may be within a range between −12 to 51. If the regenerated luminance quantization parameter here is −13, then this value is corrected to be within this range, which results in −12 if clip processing is performed, or 51 if remainder processing is performed.

At step S403, the chrominance quantization parameter reconstructing unit 204 regenerates the chrominance quantization parameter from the luminance quantization parameter regenerated at step S402 and the quantization parameter difference information. According to the present embodiment, as the applicable range of the chrominance quantization parameter is determined during the regeneration of the chrominance quantization parameter depending on the chrominance bit depth information regenerated at step S401, the chrominance quantization parameter is corrected as necessary. According to the present embodiment, for example, the chrominance bit depth is 8 bits, and so the value of the chrominance quantization parameter may be within a range between 0 to 51. If the regenerated chrominance quantization parameter here is −2, then this value is corrected to be within this range, which results in 0 if clip processing is performed, or 50 if remainder processing is performed.

At step S404, the coefficient decoding unit 205 decodes the quantization coefficient code demultiplexed at step S401, and regenerates the quantization coefficients.

At step S405, the inverse quantization unit 206 performs inverse quantization of the quantization coefficients regenerated at step S404 using the luminance quantization parameter regenerated at step S402 and the chrominance quantization parameter regenerated at step S403. The luminance quantization parameter is used for the quantization coefficient corresponding to the luminance signal, and the chrominance quantization parameter is used for the quantization coefficient corresponding to the chrominance signal. The inverse quantization result is generated as the transform coefficient.

At step S406, the inverse transform unit 207 performs inverse orthogonal transformation on the transform coefficient generated at step S405, and regenerates the prediction error.

At step S407, the predictive reconstructing unit 208 arbitrarily references decoded pixels to generate the predicted image, and regenerates the image data from this predicted image and the prediction error generated at step S406.

At step S408, the image decoding device determines whether or not the decoding of all blocks in the picture is finished, in which the decoding process is terminated if finished, or the process returns to step S404 for the next block if not finished.

The previously described configuration and operation enables a decoding of a bit stream generated according to the first Embodiment which has high chrominance image quality control by expanding the applicable range of the chrominance quantization parameter depending on the difference between the luminance bit depth information and chrominance bit depth information.

According to the present embodiment, only one shared chrominance quantization parameter is defined for the chrominance components for U and V, but separate chrominance parameters may be defined for U and V. In this case, the configuration may include multiple units of the chrominance quantization parameter reconstructing unit 204, or the chrominance quantization parameter reconstructing unit 204 may input multiple chrominance quantization parameters and generate quantization parameter difference information.

According to the present embodiment, the inverse quantization unit 206 is configured to quantize the transform coefficients for both the luminance and the chrominance, but the configuration may include a luminance quantization unit and a chrominance quantization unit to quantize the luminance transform coefficient and the chrominance transform coefficient, respectively.

According to the present embodiment, the bit stream is decoded using the same luminance quantization parameter and chrominance quantization parameter for the blocks in the picture, but the quantization parameter may be adjusted for every block in order to improve image quality. The configuration may decode the bit stream in which both the luminance quantization parameter and the quantization parameter difference information are encoded for every block. Conversely, the configuration may only enable the luminance quantization parameter to be decoded in units of blocks, and the quantization parameter difference information to be decoded only in units of pictures.

Third Embodiment

The image encoding device according to the present embodiment has the same configuration as that of the first Embodiment and illustrated in FIG. 1. The operation of the chrominance quantization parameter generating unit 109, however, is different. Therefore, except for that regarding the chrominance quantization parameter generating unit 109, the encoding operation is the same as that of the first Embodiment, and so such description is omitted.

The chrominance quantization parameter used to quantize the chrominance components is decided at the chrominance quantization parameter generating unit 109 from the luminance bit depth information and chrominance bit depth information input from the input unit 103, and the luminance quantization parameter input from the luminance quantization parameter generating unit 108. The difference with the chrominance quantization parameter generating unit 109 according to the first Embodiment is the applicable range of the chrominance quantization parameter and the method to calculate this parameter. According to the present embodiment, the applicable range of the chrominance quantization parameter itself is also restricted by the chrominance bit depth information. The applicable range of the chrominance quantization parameter QPc itself is first determined by the previously described Expression (2) from the chrominance signal bit depth BDc.

The description thus far is the same as that regarding the first Embodiment, but one difference with the first Embodiment is that the applicable range of the quantization parameter difference information QPdiff, which represents the difference between the luminance quantization parameter and the chrominance quantization parameter, is determined by the following Expression (6).

[Math. 9]

$$-12 \leq QPdiff \leq 12 \tag{6}$$

The applicable range of values of the chroma_qp_offset code in H.264 and corresponding to the previously described QPdiff is normally restricted to a range of minus 12 to plus 12, and so the applicable range of values of the quantization parameter difference information QPdiff is the same as that regarding H.264. According to the present embodiment, however, the meaning of the quantization parameter difference information QPdiff is slightly different from that of H.264 and the first Embodiment. Specifically, according to the present embodiment, the chrominance quantization parameter QPc is expressed using the following Expression (5)', which includes the luminance bit depth information BDy and the chrominance bit depth information BDc in addition to the luminance quantization parameter QPy and the quantization parameter difference information QPdiff.

$$QPc = QPy + QPdiff + 6 \times (BDy - BDc) \tag{5}'$$

The applicable range of the chrominance quantization parameter QPc according to the present embodiment may be expressed as defined by either the previously described Expression (2)' or by Expression (6)' in which Expression (5)' is substituted into Expression (6).

[Math. 10]

$$6 \times (8 - BDc) \leq QPc \leq 51 \tag{2}'$$

[Math. 11]

$$QPy - 12 - 6 \times (BDy - BDc) \leq QPc \leq QPy + 12 + 6 \times (BDy - BDc) \tag{6}'$$

As a result and similar to the first Embodiment, when the luminance quantization parameter has a minimum value of −12 in the case of the present embodiment, the chrominance quantization parameter may have a value within a range of 0 to 12 instead of being limited only to zero. According to the first Embodiment, the applicable range of the chrominance quantization parameter is expanded depending on the difference between the bit depths for the luminance and chrominance, but according to the present embodiment, a similar effect is attained by shifting the applicable range of the chrominance quantization parameter depending on the difference between the bit depths for luminance and chrominance.

The flowchart illustrating the process to encode images according to the present embodiment is similar to that regarding the first Embodiment and illustrated in FIG. 3. However, the operation of step S303 is different. Therefore, except for step S303, the encoding operation is the same as that regarding the first Embodiment, and such description is omitted.

At step S303, the chrominance quantization parameter generating unit 109 decides the chrominance quantization parameter on the basis of the luminance bit depth information and chrominance bit depth information generated at step S301, and the luminance quantization parameter generated at step S302. According to the present embodiment, however, the applicable range of the chrominance quantization parameter is restricted to a shifted range depending on the difference between the bit depth information for luminance and chrominance as described using Expression (2)' and Expression (6)'. The quantization parameter difference information is also calculated as the difference between the luminance quantization parameter generated at step S302 and the chrominance quantization parameter generated at this step.

The previously described configuration and operation, particularly at step S303, enables an encoding processing having high chrominance image quality control similar to that of the first Embodiment by shifting the applicable range of the chrominance quantization parameter depending on the difference between the luminance bit depth information and chrominance bit depth information. The applicable range of the chrominance quantization parameter has no dependent relationship with the bit depth and is determined by the distance between the luminance quantization parameter and its minimum value, and so the difference between the chrominance quantization parameter and its minimum value is narrower than the difference between the luminance quantization parameter and its minimum value. As a result, this also has an advantage of equalizing the size of distortions caused by quantizing the luminance and chrominance when the luminance bit depth and the chrominance bit depth are different.

According to the present embodiment, only one shared chrominance quantization parameter is defined for the chrominance components for U and V, but separate chrominance quantization parameters may be defined for U and V. In this case, the configuration may include multiple units of the chrominance quantization parameter generating unit 109, or the chrominance quantization parameter generating unit 109 may generate multiple chrominance quantization parameters and quantization parameter difference information.

According to the present embodiment, the quantization unit 106 is configured to quantize the transform coefficients for both the luminance and the chrominance, but the configuration may include a luminance quantization unit and a chrominance quantization unit to quantize the luminance transform coefficient and the chrominance transform coefficient, respectively.

According to the present embodiment, the configuration uses the chrominance quantization parameter as it is calculated from the luminance quantization parameter, but a value corrected according to a predetermined table or other may be used as the chrominance quantization parameter. For example, the correction table illustrated in FIG. 5 which is also used in H.264 may be used.

According to the present embodiment, the same luminance quantization parameter and chrominance quantization parameter is used for the blocks in the frame, but the quantization parameter may be adjusted for every block in order to improve image quality. The configuration may enable both the luminance quantization parameter and the quantization parameter difference information to be adjusted in units of blocks, or the configuration may only enable the luminance quantization parameter to be adjusted in units of blocks, and the quantization parameter difference information to be adjustable only in units of frames.

Fourth Embodiment

Figure 7:
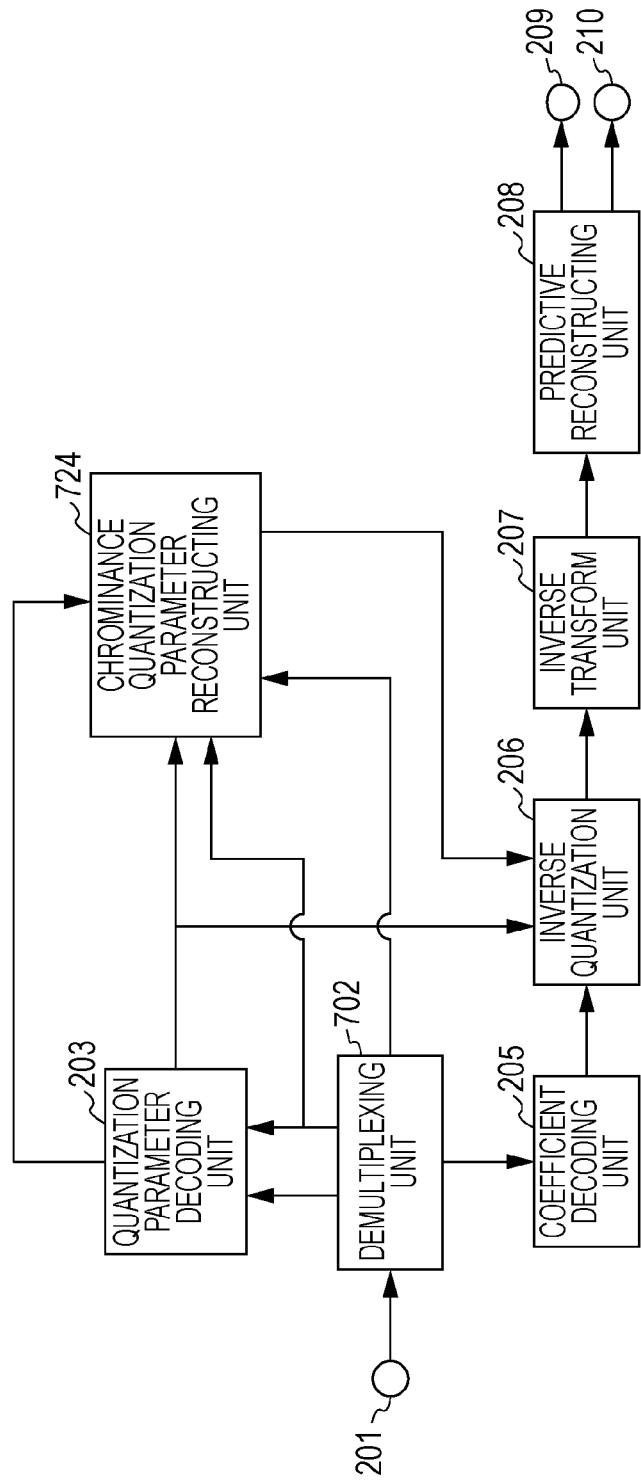
FIG. 7 is a block diagram illustrating a configuration of the image decoding device according to the fourth Embodiment.

FIG. 7 is a block diagram illustrating a configuration of the image decoding device according to the present embodiment. The components in FIG. 7 that provide the same functions as those in FIG. 2 regarding the second Embodiment have the same reference numerals, and such description is omitted.

Similar to the demultiplexing unit 202 in FIG. 2, a demultiplexing unit 702 demultiplexer the information related to the decoding process and the code data related to the coefficients from the bit stream, and decodes the code data present in the header of the bit stream. The demultiplexing unit 702 is different from the demultiplexing unit 202 in FIG. 2 in that it outputs the decoded luminance bit depth information to not only the quantization parameter decoding unit 203, but also a chrominance quantization parameter reconstructing unit 724.

The chrominance quantization parameter reconstructing unit 724 reconstructs the chrominance quantization parameter from the information related to the quantization parameter, the luminance bit depth information, and the chrominance bit depth information. This is different to the chrominance quantization parameter reconstructing unit 204 in FIG. 2 in that the luminance bit depth information is also input.

Hereafter, the operation to decode images in the previously described image decoding device will be described. The information related to the decoding process and the code data related to the coefficients are demultiplexed from the bit stream at the demultiplexing unit 702, and the code data present in the header of the bit stream, the quantization parameter, and the code data necessary to decode the bit depth information are extracted. Specifically, the quantization parameter information code, the luminance bit depth information, the chrominance bit depth information, and the quantization coefficient code are extracted. According to the present embodiment, the luminance bit depth information and the chrominance bit depth information are first extracted and decoded from the header in the bit stream illustrated in FIG. 6, and then the quantization parameter information code is extracted. The decoded luminance bit depth information is output to the quantization parameter decoding unit 203 and the chrominance quantization parameter reconstructing unit 724, and the chrominance bit depth information is output to the chrominance quantization parameter reconstructing unit 724. Conversely, the extracted quantization parameter information code is output to the quantization parameter decoding unit 203, and the remaining code data including the quantization coefficient code is output to the coefficient decoding unit 205.

The chrominance quantization parameter is regenerated at the chrominance quantization parameter reconstructing unit 724 from the luminance quantization parameter and quantization parameter difference information input from the quantization parameter decoding unit 203, and the luminance bit depth information input from the demultiplexing unit 702. According to the present embodiment, the chrominance quantization parameter, similar to the third Embodiment, is regenerated as expressed by the previously described Expression (5)' depending on the luminance bit depth information and the chrominance bit depth information in addition to the luminance quantization parameter and the quantization parameter difference information. According to the present embodiment, the applicable range of the chrominance quantization parameter during the regeneration of the chrominance quantization parameter is the range as expressed by Expression (2)' using the chrominance bit depth information according to the third Embodiment. For this reason, when the regenerated chrominance quantization parameter is outside the range of the color expressed by Expression (2)', a clip processing or remainder processing is performed to correct the value to be within this range. The correction processing here is not particularly limited as long as it the same as the correction processing regarding the chrominance quantization parameter generating unit 109 according to the third Embodiment. The regenerated chrominance quantization parameter is output to the inverse quantization unit 206.

The flowchart illustrating the process to decode images according to the present embodiment is similar to that regarding the second Embodiment in FIG. 4. However, the operation of step S403 is different. Therefore, except for step S403, the decoding operation is the same as that regarding the second Embodiment and such description is omitted.

At step S403, the chrominance quantization parameter reconstructing unit 724 regenerates the chrominance quantization parameter from the luminance bit depth information and the chrominance bit depth information regenerated at step S401, and the luminance quantization parameter and quantization parameter difference information regenerated at step S402. Specifically, the chrominance quantization parameter is regenerated on the basis of the previously described Expression (5)'. According to the present embodiment, as the applicable range of values of the chrominance quantization parameter is determined during the regeneration of the chrominance quantization parameter depending on the chrominance bit depth information regenerated at step S401, the chrominance quantization parameter is corrected as necessary. Specifically and as described regarding the second Embodiment, when the regenerated chrominance quantization parameter is outside of the range, a clip processing or remainder processing is performed to correct the chrominance quantization parameter to be within the range.

The previously described configuration and operation, particularly step S403, enables decoding of a bit stream generated according to the third Embodiment which has high chrominance image quality control, by shifting the applicable range of the chrominance quantization parameter.

According to the present embodiment, only one shared chrominance quantization parameter is defined for the chrominance components for U and V, but separate chrominance quantization parameters may be defined for U and V. In this case, the configuration may include multiple units of the chrominance quantization parameter reconstructing unit 724, or the chrominance quantization parameter reconstructing unit 724 may input multiple chrominance quantization parameters and generate quantization parameter difference information.

According to the present embodiment, description has been made regarding an arrangement where the inverse quantization unit 206 is configured to quantize the transform coefficients for both the luminance and the chrominance, but the configuration may include a luminance quantization unit and a chrominance quantization unit to quantize the luminance transform coefficient and the chrominance transform coefficient, respectively.

According to the present embodiment, description has been made regarding an arrangement where the bit stream is decoded using the same luminance quantization parameter and chrominance quantization parameter for the blocks in the picture, but the bitstream of which the quantization parameter is adjusted in units of blocks, in order to improve image quality. The configuration may decode the bit stream in which both the luminance quantization parameter and the quantization parameter difference information are encoded in units of blocks. Conversely, the configuration may only enable the luminance quantization parameter to be decoded in units of blocks, and the quantization parameter difference information to be decoded in units of pictures.

Fifth Embodiment

The previously described embodiments were described with each processing unit illustrated in FIGS. 1, 2, and 7 configures as hardware. However, the processing performed by each processing unit illustrated in these figures may also be configured as a computer program.

Figure 8:
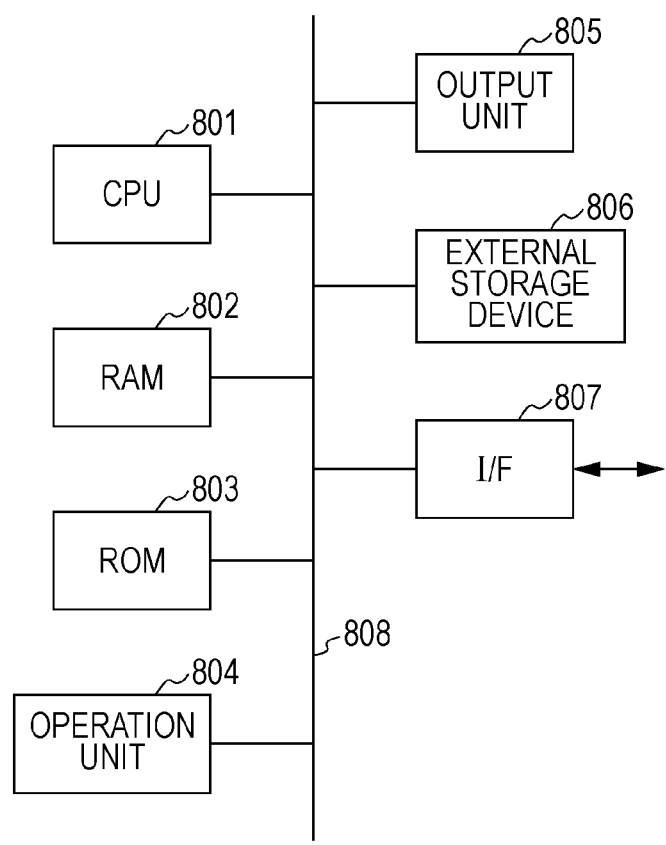
FIG. 8 is a block diagram illustrating an example hardware configuration of a computer capable of applying the image encoding device and decoding device according to the present invention.

FIG. 8 is a block diagram illustrating an example hardware configuration of a computer capable of applying the image display device according to the previously described embodiments.

A CPU 801 performs overall control of the computer using computer programs and data stored in a RAM 802 and ROM 803 as well as executes each of the processing performed by the image processing device according to the previously described embodiments. That is to say, the CPU 801 functions as each processing unit illustrated in FIGS. 1, 2, and 7.

The RAM 802 includes an area for temporarily storing a computer program loaded from an external storage device 806, data obtained externally via an I/F (interface) 807, and other data. The RAM 802 also includes a work area used when the CPU 801 executes each processing. That is to say, the RAM 802 is allocated as frame memory, for example, and other various areas may be arbitrarily supplied.

The ROM 803 stores settings data for the computer, the boot program, and the like. An operation unit 804 is configured from a keyboard, mouse, or the like, and inputs various instructions to the CPU 801 by user operation of the computer. An output unit 805 displays the processing results from the CPU 801. The output unit 805 is configured by a liquid crystal display, for example.

The external storage device 806 is a large capacity storage device such as a hard disk drive device. The external storage device 806 stores the OS (operating system) and the computer program for executing the functions of the units illustrated in FIGS. 1, 2, and 7 via the CPU 801. The external storage device 806 may also store the image data to be processed.

The computer program and data stored in the external storage device 806 is arbitrarily loaded into the RAM 802 in accordance with control by the CPU 801 to be processed by the CPU 801. The I/F 807 may connect networks such as a LAN or the Internet, and other devices such as a projection device or display device, and the computer may obtain and send various information via the I/F 807. A bus 808 connects the previously described components.

The operation capable from the previously described configuration corresponds to the control operations described regarding the previously described flowcharts performed primarily by the CPU 801.

OTHER EMBODIMENTS

The aim of the present invention is achieved by supplying to a system a recording medium to which the code of a computer program configured to execute the previously described functions is recorded, and this system reads and executes the code of this computer program. In this case, the code for the computer program read from the recording medium enables the functions regarding the previously described embodiments, and the recording medium to which the code of this computer program is recorded configures the present invention. This also includes the case in which the operating system (OS) or similar running on the computer performs a portion or all of the actual processing on the basis of the code instructions of this computer program, and the previously described functions are enabled by this processing.

The following form may also be implemented. That is to say, the computer program code read from the recording medium may be written to a function-enhanced card inserted into the computer or a memory provisioned to a function-enhanced unit connected to the computer. This also includes the case in which a CPU or other provisioned in this function-enhanced card or function-enhanced unit performs a portion or all of the actual processing on the basis of the code instructions of this program, and the previously described functions are enabled by this processing.

When applying the present invention to the previously described recording medium, the code for the computer program corresponding to the previously described flowcharts is stored in this recording medium.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-268299, filed Dec. 7, 2012, which is hereby incorporated by reference herein in its entirety.

The invention claimed is:

1. An image encoding device comprising:
   an input unit configured to input a luminance signal with a first bit depth of an image and a chrominance signal with a second bit depth of the image where the second bit depth is different from the first bit depth;
   a first determining unit configured to determine a luminance quantization parameter used to quantize the input luminance signal;
   a second determining unit configured to determine a chrominance quantization parameter used to quantize the input chrominance signal, the chrominance quantization parameter being a value within a range depending on a difference between the first bit depth and the second bit depth; and
   a quantizing unit configured to quantize the input luminance signal by the luminance quantization parameter, and to quantize the input chrominance signal by the chrominance quantization parameter.

2. The image encoding device according to claim 1, wherein the range is extended depending on the difference between the first bit depth and the second bit depth.

3. The image encoding device according to claim 1, wherein the range is shifted depending on the difference between the first bit depth and the second bit depth.

4. The image encoding device according to claim 1, wherein the second determining unit determines the value of the chrominance quantization parameter depending on the luminance quantization parameter.

5. The image encoding device according to claim 1, wherein the second determining unit determines the value of the chrominance quantization parameter within the range which is wider in a case where the first bit depth is larger than the second bit depth than a range in a case where the first bit depth is equal to the second bit depth.

6. The image encoding device according to claim 1, wherein the second determining unit determines the value of the chrominance quantization parameter within the range which is narrower in a case where the first bit depth is smaller than the second bit depth than a range in a case where the first bit depth equal to the second bit depth.

7. The image encoding device according to claim 1, wherein the range has an upper limit which is larger in a case where the first bit depth is larger than the second bit depth than an upper limit in a case where the first bit depth is equal to the second bit depth, and
   wherein the range has an upper limit which is smaller in a case where the first bit depth is smaller than the second bit depth than an upper limit in a case where the first bit depth is equal to the second bit depth.

8. An image decoding device comprising:
   a first decoding unit configured to input a bit stream in which a luminance signal with a first bit depth of an image and a chrominance signal with a second bit depth which is different from the first bit depth of the image are encoded, and to decode a header including the first bit depth and the second bit depth;
   a second decoding unit configured to decode quantization coefficients;
   a first reconstructing unit configured to reconstruct a luminance quantization parameter used to perform inverse quantization of luminance components of the quantization coefficient;
   a second reconstructing unit configured to reconstruct a chrominance quantization parameter used to perform inverse quantization of chrominance components of the quantization coefficient, the chrominance quantization parameter being a value within a range determined depending on a difference between the first bit depth and the second bit depth; and
   an inverse quantization unit configured to perform inverse quantization of luminance components of the quantization coefficients using the luminance quantization parameter, and to perform inverse quantization of chrominance components of the quantization coefficients using the chrominance quantization parameter.

9. The image decoding device according to claim 8, wherein the range is extended depending on the difference between the first bit depth and the second bit depth.

10. The image decoding device according to claim 8, wherein the range is shifted depending on the difference between the first bit depth and the second bit depth.

11. The image decoding device according to claim 8, wherein the second reconstructing unit reconstructs the value of the chrominance quantization parameter depending on the luminance quantization parameter.

12. The image decoding device according to claim 8, wherein the second reconstructing unit reconstructs the value of the chrominance quantization parameter within the range which is wider in a case where the first bit depth is larger than the second bit depth than a range in a case where the first bit depth is equal to the second bit depth.

13. The image decoding device according to claim 8, wherein the second reconstructing unit reconstructs the value of the chrominance quantization parameter within the range which is narrower in a case where the first bit depth is smaller than the second bit depth than a range in a case where the first bit depth is equal to the second bit depth.

14. The image decoding device according to claim 8, wherein the range has an upper limit which is larger in a case where the first bit depth is larger than the second bit depth than an upper limit in a case where the first bit depth is equal to the second bit depth, and
    wherein the range has an upper limit which is smaller in a case where the first bit depth is smaller than the second bit depth than an upper limit in a case where the first bit depth is equal to the second bit depth.

15. An image encoding method comprising:
    an input process in which a luminance signal with a first bit depth of an image and a chrominance signal with a second bit depth of the image are input where the second bit depth is different from the first bit depth;
    a first determination process in which a luminance quantization parameter used to quantize the input luminance signal is determined;
    a second determination process in which a chrominance quantization parameter used to quantize the input chrominance signal is determined, the chrominance quantization parameter being a value within a range depending on a difference between the first bit depth and the second bit depth; and
    a quantizing process in which the input luminance signal is quantized by the luminance quantization parameter, and the input chrominance signal is quantized by the chrominance quantization parameter.

16. An image decoding method comprising:
    a first decoding process in which a bit stream in which a luminance signal with a first bit depth of an image and a chrominance signal with a second bit depth which is different from the first bit depth of the image are encoded is input, and a header including the first bit depth and the second bit depth is decoded;
    a second decoding process in which quantization coefficients are decoded;

a first reconstructing process in which a luminance quantization parameter used to perform inverse quantization of luminance components of the quantization coefficient is reconstructed;

a second reconstructing process in which a chrominance quantization parameter used to perform inverse quantization of chrominance components of the quantization coefficient is reconstructed, the chrominance quantization parameter being a value within a range determined depending on a difference between the first bit depth and the second bit depth; and an inverse quantization process in which luminance components of the quantization coefficients are subjected to inverse quantization using the luminance quantization parameter, and in which chrominance components of the quantization coefficients are subjected to inverse quantization using the chrominance quantization parameter.

17. A non-transitory computer-readable storage medium storing a computer program for causing a computer to execute a method comprising:

an input process in which a luminance signal with a first bit depth of an image and a chrominance signal with a second bit depth of the image are input where the second bit depth is different from the first bit depth;

a first determination process in which a luminance quantization parameter used to quantize the input luminance signal is determined;

a second determination process in which a chrominance quantization parameter used to quantize the input chrominance signal is determined, the chrominance quantization parameter being a value within a range depending on a difference between the first bit depth and the second bit depth; and a quantizing process in which the input luminance signal is quantized by the luminance quantization parameter, and the input chrominance signal is quantized by the chrominance quantization parameter.

18. A non-transitory computer-readable storage medium storing a computer program for causing a computer to execute a method comprising:

a first decoding process in which a bit stream in which a luminance signal with a first bit depth of an image and a chrominance signal with a second bit depth which is different from the first bit depth of the image are encoded is input, and a header including the first bit depth and the second bit depth is decoded;

a second decoding process in which quantization coefficients are decoded;

a first reconstructing process in which a luminance quantization parameter used to perform inverse quantization of luminance components of the quantization coefficient is reconstructed;

a second reconstructing process in which a chrominance quantization parameter used to perform inverse quantization of chrominance components of the quantization coefficient is reconstructed, the chrominance quantization parameter being a value within a range determined depending on a difference between the first bit depth and the second bit depth; and an inverse quantization process in which luminance components of the quantization coefficients are subjected to inverse quantization using the luminance quantization parameter, and in which chrominance components of the quantization coefficients are subjected to inverse quantization using the chrominance quantization parameter.

* * * * *